(12) United States Patent
Yamanaka et al.

(10) Patent No.: US 8,167,205 B2
(45) Date of Patent: May 1, 2012

(54) CARD READER WITH FIRST OPERATION PART AND SECOND OPERATION PART

(75) Inventors: Nobuyuki Yamanaka, Nagano (JP); Fumihiko Akahane, Nagano (JP)

(73) Assignee: Nidec Sankyo Corporation (JP)

( * ) Notice: Subject to any disclaimer, the term of this patent is extended or adjusted under 35 U.S.C. 154(b) by 349 days.

(21) Appl. No.: 12/430,641

(22) Filed: Apr. 27, 2009

(65) Prior Publication Data

US 2009/0266894 A1 Oct. 29, 2009

(30) Foreign Application Priority Data

Apr. 28, 2008 (JP) .................................. 2008-117521

(51) Int. Cl.
*G06K 7/08* (2006.01)

(52) U.S. Cl. ...................................................... 235/449

(58) Field of Classification Search .................... 235/449
See application file for complete search history.

(56) References Cited

U.S. PATENT DOCUMENTS

| | | | | |
|---|---|---|---|---|
| 3,735,095 A | * | 5/1973 | Mutz et al. | 235/480 |
| 4,496,830 A | * | 1/1985 | Yoshihara et al. | 235/458 |
| 2003/0074260 A1 | * | 4/2003 | Sugiyama et al. | 705/14 |
| 2003/0178494 A1 | * | 9/2003 | Abe et al. | 235/475 |
| 2005/0116036 A1 | * | 6/2005 | Akahane et al. | 235/449 |

FOREIGN PATENT DOCUMENTS

JP 2006-286108 A 10/2006

* cited by examiner

*Primary Examiner* — Daniel Hess
*Assistant Examiner* — David Tardif
(74) *Attorney, Agent, or Firm* — Cantor Colburn LLP

(57) ABSTRACT

A card reader may include a first card operation part having a first reproducing and recording part, a first feeding passage, and a first card pressing mechanism structured to press the card toward a first card feeding reference face, and a second card operation part having a second reproducing and recording part, a second feeding passage, and a second card pressing mechanism structured to press the card toward a second card feeding reference face which is formed on the opposite side to the first card feeding reference face. The first and second card operation parts may be adjacently disposed in a feeding direction of the card. The first and second reproducing and recording parts may be disposed in a substantially point-symmetrical manner.

9 Claims, 10 Drawing Sheets

Fig. 5
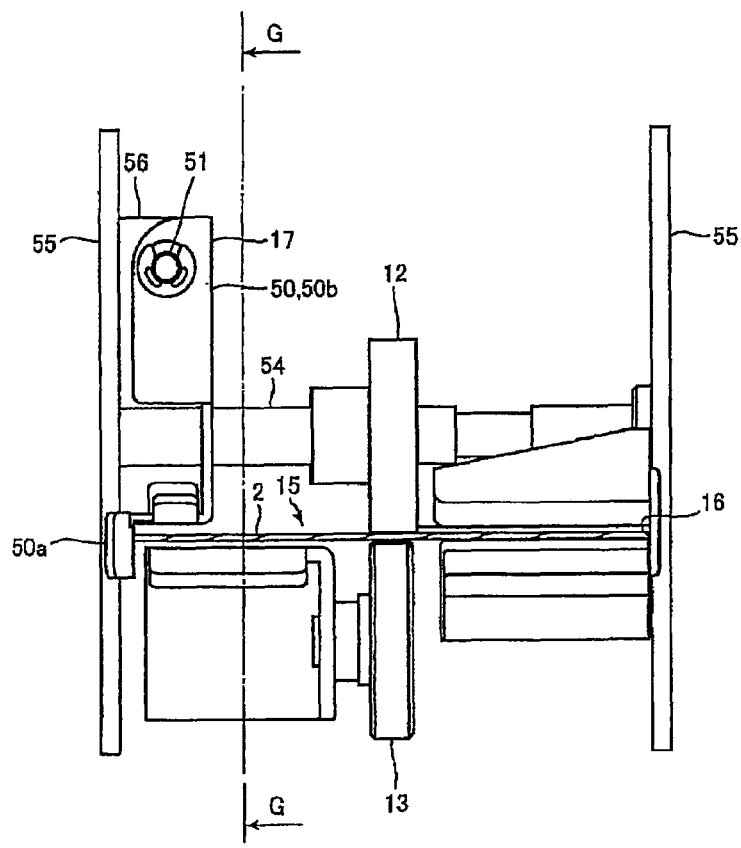
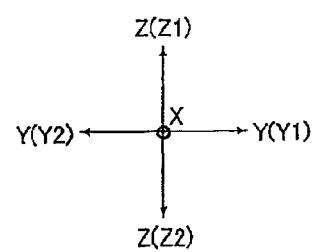

CARD READER WITH FIRST OPERATION PART AND SECOND OPERATION PART

CROSS REFERENCE TO RELATED APPLICATION

The present invention claims priority under 35 U.S.C. §119 to Japanese Application No. 2008-117521 filed Apr. 28, 2008, the entire contents of which are incorporated herein by reference.

FIELD OF THE INVENTION

An embodiment of the present invention may relate to a card reader in which information on and/or in a card is reproduced and/or recorded on and/or in the card.

BACKGROUND OF THE INVENTION

A magnetic recording medium reading and writing device in which reading and writing operations for a magnetic recording medium taken into in various directions or postures are performed at a high speed has been proposed (see, for example, Japanese Patent Laid-Open No. 2006-286108).

The magnetic recording medium reading and writing device which is described in the Patent Reference is arranged on one side in a short widthwise direction of a magnetic recording medium to be carried with a first reading and writing unit, which includes a magnetic head abutting with the magnetic recording medium from a lower side and a second reading and writing unit which includes a magnetic head abutting with the magnetic recording medium from an upper side. Further, the magnetic recording medium reading and writing device is also arranged on the other side in the short widthwise direction of the magnetic recording medium with a third reading and writing unit, which includes a magnetic head abutting with the magnetic recording medium from the lower side and a fourth reading and writing unit which includes a magnetic head abutting with the magnetic recording medium from the upper side. The first reading and writing unit, the second reading and writing unit, the third reading and writing unit, and the fourth reading and writing unit are disposed in a card feeding direction in this order.

In the magnetic recording medium reading and writing device as described in the Patent Reference, reading and writing operations for a magnetic recording medium are performed at a high speed regardless of a taking-in direction of a magnetic recording medium. The magnetic recording medium reading and writing device is usable in an application like an automatic ticket checking device in a station where a high degree of accuracy is not required at a recording position (truck position) of magnetic information in the short widthwise direction of the magnetic recording medium. However, it is difficult to use the magnetic recording medium reading and writing device in an application where a truck position requires a high degree of accuracy. In other words, the above-mentioned magnetic recording medium reading and writing device is difficult to adequately perform reproducing operation of information recorded on a card or recording operation of information on a card whose truck position requires a high degree of accuracy.

SUMMARY OF THE INVENTION

In view of the problems described above, at least an embodiment of the present invention may advantageously provide a card reader which is usable even in an application where recording positional accuracy of information to a card is required and which is capable of performing reproduction of information recorded on or in the card and recording of information on or in the card regardless of an inserted direction of the card.

According to at least an embodiment of the present invention, there may be provided a card reader including a first card operation part and a second card operation part. The first card operation part includes a first reproducing and recording part which performs reproduction of information from a card and/or recording of information to the card, a first feeding passage through which the card is carried, and a first card pressing mechanism for pressing the card toward a first card feeding reference face of the first feeding passage which is formed on one side in a widthwise direction of the card which is perpendicular to a feeding direction of the card. The second card operation part includes a second reproducing and recording part which performs reproduction of information from the card and/or recording of information to the card, a second feeding passage through which the card is carried, and a second card pressing mechanism for pressing the card toward a second card feeding reference face of the second feeding passage which is formed on the other side in the widthwise direction of the card. Further, the first card operation part and the second card operation part are adjacently disposed in the feeding direction of the card so that the card is carried between the first card operation part and the second card operation part, and the first reproducing and recording part and the second reproducing and recording part are disposed in a substantially point-symmetrical manner with respect to a virtual reference point on a virtual center line which passes a substantially center position in the widthwise direction of the card between the first card feeding reference face and the second card feeding reference face when viewed from a thickness direction of the card.

In the card reader in accordance with an embodiment of the present invention, the first card operation part having a first reproducing and recording part which performs reproduction and/or recording of information from and/or to the card and the second card operation part having a second reproducing and recording part which performs reproduction and/or recording of information from and/or to the card are adjacently disposed in the feeding direction of the card so that the card is carried between the first card operation part and the second card operation part. Further, the first reproducing and recording part and the second reproducing and recording part are disposed in a substantially point-symmetrical manner with respect to the virtual reference point on the virtual center line which passes the substantially center position in the widthwise direction of the card between the first card feeding reference face and the second card feeding reference face when viewed from the thickness direction of the card. Therefore, even when a recording position of information to a card is displaced from the center position in the widthwise direction of the card, operation of the card which is inserted from its one end side is performed in the first card operation part and operation of the card inserted from its opposite end side is performed in the second card operation part. In other words, in accordance with this embodiment, reproduction of information from a card and recording of information to the card are performed regardless of an inserted direction of the card.

Further, in accordance with an embodiment of the present invention, the first card operation part includes a first card pressing mechanism for pressing the card toward a first card feeding reference face of the first feeding passage which is formed on one side in a widthwise direction of the card which is perpendicular to a feeding direction of the card, and the second card operation part includes a second card pressing mechanism for pressing the card toward a second card feeding reference face of the second feeding passage which is formed on the other side in the widthwise direction of the card. Therefore, even when the first reproducing and recording part and the second reproducing and recording part are disposed in a substantially point-symmetrical manner with respect to the virtual reference point on the virtual center line, recording position of information to a card and the first reproducing and recording part can be aligned with each other by the first card pressing mechanism in the first card operation part, and recording position of information to the card and the second reproducing and recording part can be aligned with each other by the second card pressing mechanism in the second card operation part. As a result, in the card reader in this embodiment, reproducing operation of information, which is recorded in a card which requires a high degree of recording positional accuracy of information, and recording operation of information to the card are adequately performed and thus the card reader is usable even in an application where a high degree of recording positional accuracy of information to a card is required.

In accordance with an embodiment of the present invention, a center of the first feeding passage and a center of the second feeding passage in the widthwise direction of the card are displaced from each other in the widthwise direction of the card so that a distance in the widthwise direction of the card between the first card feeding reference face and the second card feeding reference face is substantially equal to a width of the card. According to this structure, even when the first card feeding reference face is formed on one side in the widthwise direction of a card and the second card feeding reference face is formed on the other side in the widthwise direction of the card, the card is carried along both the reference faces of the first card feeding reference face and the second card feeding reference face when the card is carried between the first card operation part and the second card operation part. Therefore, even when a card is moved between the first card operation part and the second card operation part, the first reproducing and recording part or the second reproducing and recording part is smoothly aligned with the recording position of information to the card.

In accordance with an embodiment of the present invention, the first card operation part includes a plurality of first feeding rollers for feeding the card and a first drive source for driving the first feeding rollers, the second card operation part includes a plurality of second feeding rollers for feeding the card and a second drive source for driving the second feeding rollers, and one of the first feeding roller which is disposed on the most second card operation part side and the second feeding roller which is disposed on the most first card operation part side is connected with a clutch mechanism for connecting or disconnecting power transmission from the first drive source or the second drive source. According to this structure, even when a feeding speed of a card by the first feeding rollers and a feeding speed of the card by the second feeding rollers are different from each other, the card is smoothly moved between the first card operation part and the second card operation part.

In accordance with an embodiment of the present invention, the virtual reference point is disposed between the first card operation part and the second card operation part in the feeding direction of the card, and the second card operation part is provided with structure almost similar to the first card operation part, and the first card operation part and the second card operation part are disposed in a substantially point-symmetrical manner with respect to the virtual reference point. Specifically, the second card operation part is provided with structure almost similar to or substantially the same as the first card operation part and is disposed in a reversed manner to the first card operation part. According to this structure, the structure of the first card operation part is almost similar to or substantially the same as the structure of the second card operation part and thus the first card operation part and the second card operation part can be controlled with the same control method. As a result, control programs for the card reader can be simplified.

In accordance with an embodiment of the present invention, the card is a magnetic card provided with a magnetic stripe, and the first reproducing and recording part and the second reproducing and recording part are a magnetic head. In this case, a detection mechanism for detecting the magnetic stripe may be disposed on an end side in the widthwise direction of the card at a card insertion part into which the card is inserted. According to this structure, it can be judged by using the detection mechanism provided in the card insertion part whether reproducing and recording operations of a card inserted into the card reader are performed in the first card operation part or in the second card operation part. In other words, at the time when a card is inserted, it can be judged whether reproducing and recording operations of the card are performed in the first card operation part or in the second card operation part. Therefore, reproducing operation and recording operation of an inserted card can be smoothly performed.

In accordance with an embodiment of the present invention, the card reader includes a first control section for controlling the first card operation part and a second control section for controlling the second card operation part. The first control section is connected to a higher control section which controls a host device on which the card reader is mounted, and the second control section is connected to the first control section, and the first control section exchanges control signals with the higher control section and the second control section exchanges control signals with the first control section. In this case, the first control section controls the first card operation part on the basis of a control command from the higher control section, and the second control section controls the second card operation part on the basis of a control command from the first control section.

According to this structure, although the higher control section exchanges control signals only with the first control section, the higher control section is capable of controlling both of the first card operation part and the second card operation part. For example, the higher control section controls the first card operation part and the second card operation part by means of that the higher control section exchanges control signals for controlling the first card operation part with the first control section. Therefore, operations in the higher control section are simplified and control programs for the higher control section are simplified. Further, the higher control section is capable of indirectly controlling the second card operation part even though the second control section is not connected to the higher control section directly. Therefore, in the higher control section, a port for connecting with the second control section is not required and a structure of the higher control section can be simplified.

Further, according to at least an embodiment of the present invention, there may be provided a card reader including a first card operation part and a second card operation part. The first card operation part includes a first reproducing and recording part which performs reproduction of information from a card and/or recording of information to the card, a plurality of first feeding rollers for feeding the card, a first drive source for driving the first feeding rollers, a first feeding passage through which the card is carried, and a first card pressing mechanism for pressing the card toward a first card feeding reference face of the first feeding passage which is formed on one side in a widthwise direction of the card which is perpendicular to a feeding direction of the card. The second card operation part includes a second reproducing and recording part which performs reproduction of information from the card and/or recording of information to the card, a plurality of second feeding rollers for feeding the card, a second drive source for driving the second feeding rollers, a second feeding passage through which the card is carried, and a second card pressing mechanism for pressing the card toward a second card feeding reference face of the second feeding passage which is formed on the other side in the widthwise direction of the card. The first card operation part and the second card operation part are adjacently disposed in a feeding direction of the card so that the card is carried between the first card operation part and the second card operation part, and a distance in the widthwise direction of the card between the first card feeding reference face and the second card feeding reference face is substantially equal to a width of the card. In addition, one of the first feeding roller which is disposed on the most second card operation part side and the second feeding roller which is disposed on the most first card operation part side is connected with a clutch mechanism for connecting or disconnecting power transmission from the first drive source or the second drive source. According to this structure, even when a feeding speed of a card by the first feeding rollers and a feeding speed of the card by the second feeding rollers are different from each other, the card is smoothly moved between the first card operation part and the second card operation part.

As described above, according to at least an embodiment of the present invention, the card reader is usable in an application where a high degree of recording positional accuracy of information to a card is required and, in addition, the card reader is capable of performing reproduction of information from the card and recording of information to the card regardless of a direction where a card is inserted.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a side view showing a first pressing mechanism and the like which are viewed from the "F-F" direction in FIG. 1.

DETAILED DESCRIPTION OF THE PREFERRED EMBODIMENTS

An embodiment of the present invention will be described below with reference to the accompanying drawings.

Figure 1:
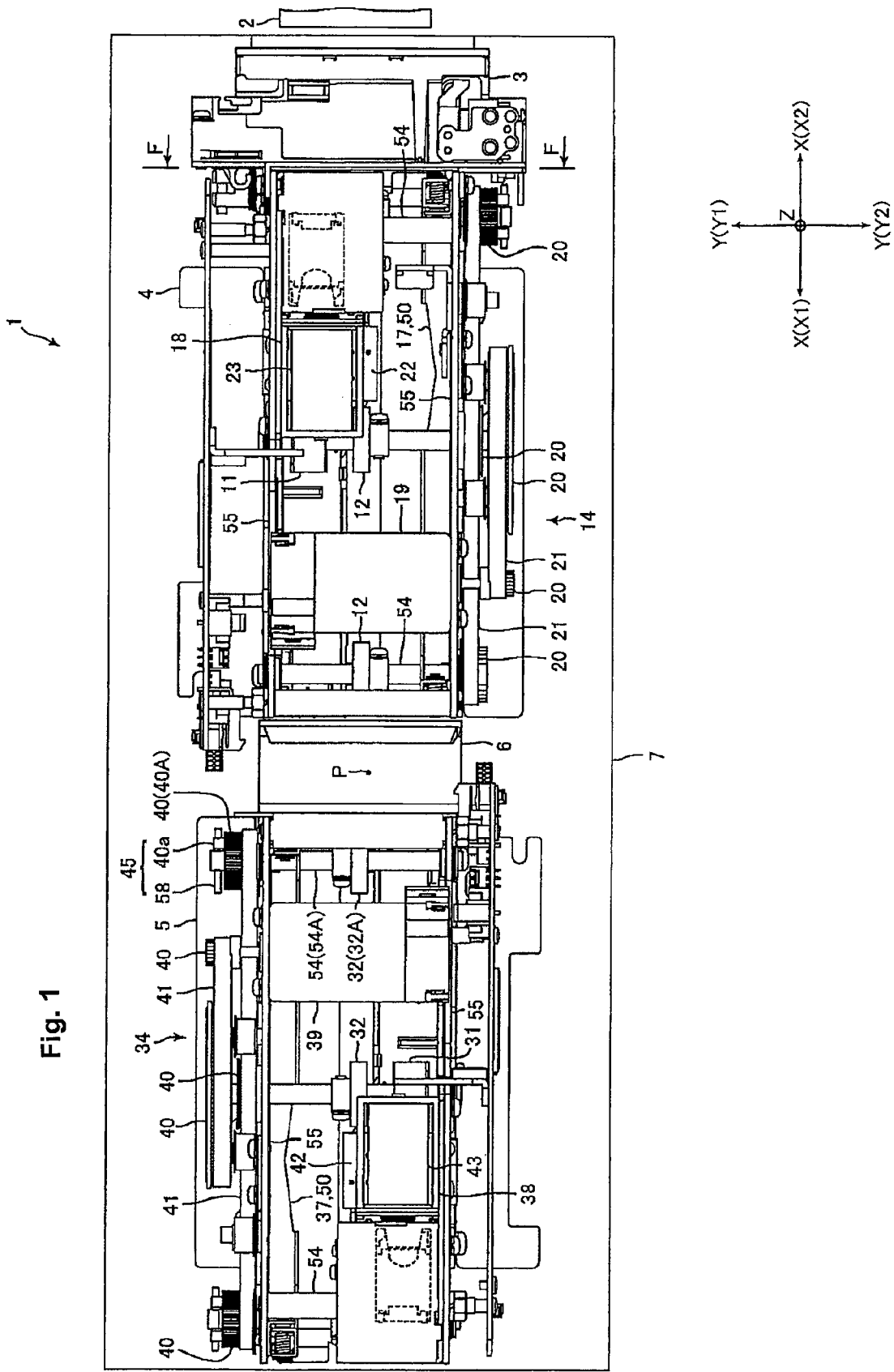
FIG. 1 is a plan view showing a card reader in accordance with an embodiment of the present invention.
Figure 2:
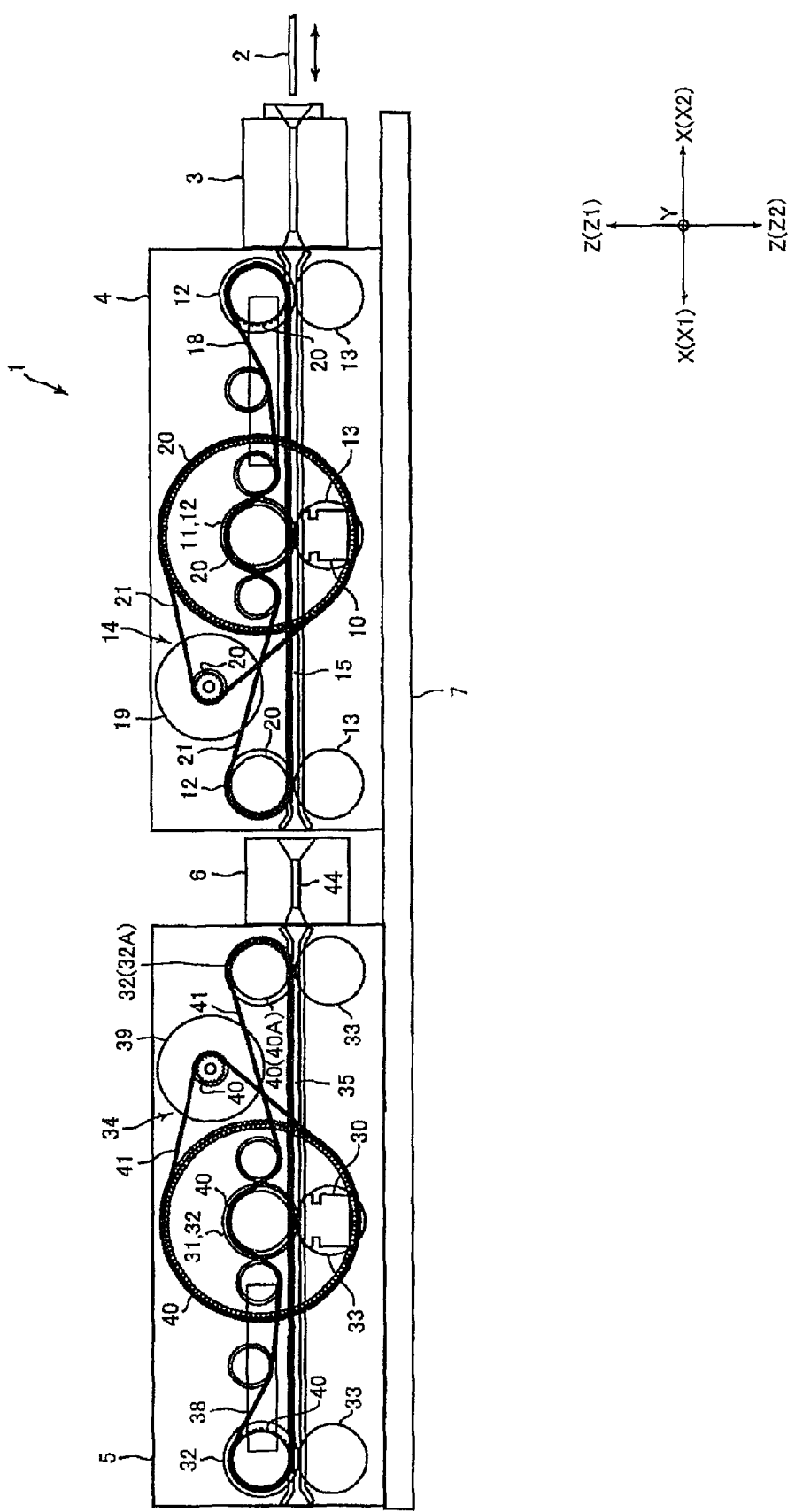
FIG. 2 is a schematic side view showing an inside structure of the card reader shown in FIG. 1.
Figure 3:
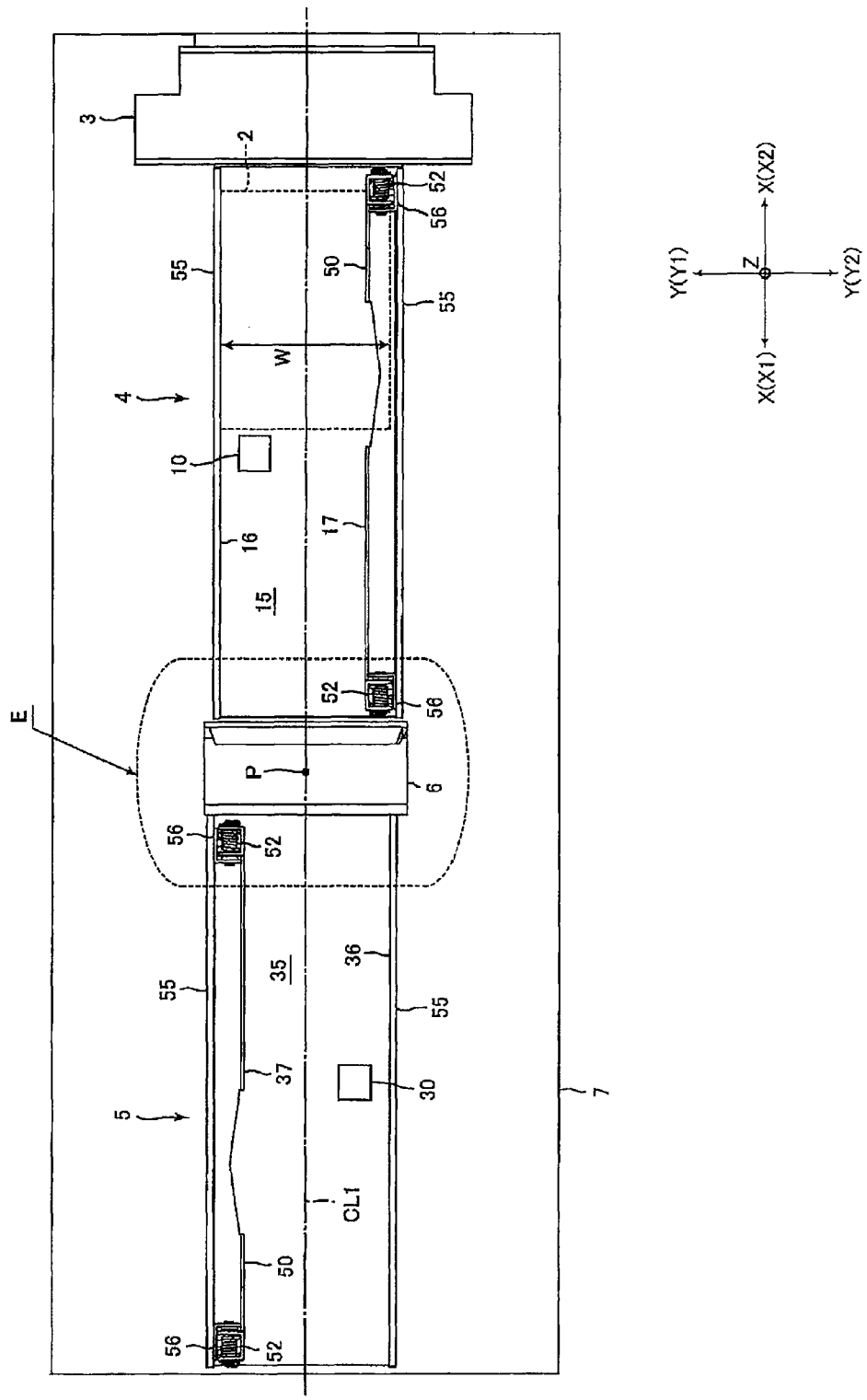
FIG. 3 is an explanatory plan view showing an arrangement relationship between a first card operation part and a second card operation part shown in FIG. 1.
Figure 4:
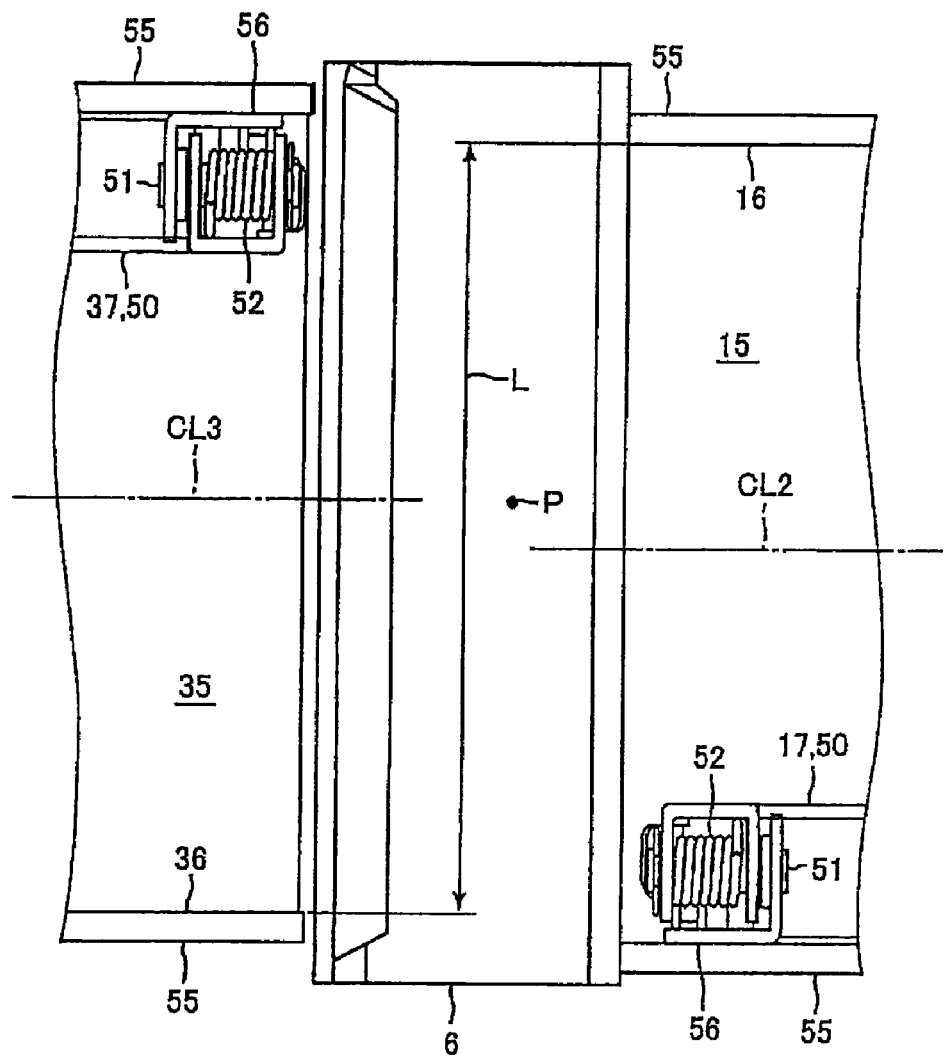
FIG. 4 is an enlarged plan view showing the "E" part in FIG. 3.

FIG. 1 is a plan view showing a card reader 1 in accordance with an embodiment of the present invention. FIG. 2 is a schematic side view showing an inside structure of the card reader 1 shown in FIG. 1. FIG. 3 is an explanatory plan view showing an arrangement relationship between a first card operation part 4 and a second card operation part 5 shown in FIG. 1. FIG. 4 is an enlarged plan view showing the "E" part in FIG. 3.

The card reader 1 in this embodiment is a device in which reproduction and recording of information are performed from and to a card 2. In the card reader 1 in this embodiment, even when the card 2 is inserted from either end in a longitudinal direction of the card 2, reproduction of information recorded on the card 2 and recording of information on the card 2 are performed.

As shown in FIGS. 1 and 2, the card reader 1 includes a card insertion part 3 into which a card 2 is inserted, a first card operation part 4 for performing reproducing and recording operation of information on an card 2 inserted from one end in the longitudinal direction of the card 2, a second card operation part 5 for performing reproducing and recording operation of information on the card 2 inserted from the other end in the longitudinal direction of the card 2, and a connecting part 6 which is disposed between the first card operation part 4 and the second card operation part 5.

In this embodiment, a card 2 is carried in the "X" direction in FIG. 1. In other words, the "X" direction is a feeding direction of the card 2. Further, in this embodiment, the card 2 is inserted in the "X1" direction in FIG. 1 and the card 2 is ejected in the "X2" direction. Further, the "Z" direction in FIG. 1 is a thickness direction of the card 2 and the "Y" direction perpendicular to the "X" direction and the "Z" direction is a width (short widthwise) direction of the card 2. In this specification, the "X1" direction side in FIG. 1 is referred to as a back side, the "X2" direction side is as a front side, the "Y1" direction side is as a right side, the "Y2" direction side is as a left side, the "Z1" direction side is as an upper side, and the "Z2" direction side is as a lower side.

The card insertion part 3 is fixed at an end on the front side of the first card operation part 4, and the connecting part 6 is fixed at an end on the front side of the second card operation part 5. Further, the first card operation part 4 and the second card operation part 5 are fixed on a base plate 7.

The first card operation part 4 and the second card operation part 5 are disposed so as to be adjacent to each other in the "X" direction (feeding direction). Specifically, the first card operation part 4 and the second card operation part 5 are adjacently disposed in this order from the front side to the back side. Further, in this embodiment, the first card operation part 4 and the second card operation part 5 are adjacently disposed so that a distance between the first feeding roller 12, which is disposed on the most back side among three pieces of first feeding rollers 12 provided in the first card operation part 4, and the second feeding roller 32 which is disposed on the most front side among three pieces of second feeding rollers 32 provided in the second card operation part 5 is set to be shorter than a length of a card 2 (length in the feeding direction). In other words, the first card operation part 4 and the second card operation part 5 are adjacently disposed so that a card 2 is carried between the first card operation part 4 and the second card operation part 5 by the first feeding rollers 12 and the second feeding rollers 32.

A card 2 in this embodiment is, for example, a rectangular card made of vinyl chloride whose thickness is about 0.7-0.8 mm. A magnetic stripe (not shown) in which magnetic information is recorded is formed on a surface of the card 2. In other words, the card 2 is a magnetic card. The magnetic stripe is formed in an elongated rectangular shape whose longitudinal direction is the longitudinal direction of the card 2. Further, the magnetic stripe is formed at a position shifted from a center position of the card 2 in the short side direction (widthwise direction).

An IC chip may be fitted to a surface of the card 2. In other words, the card 2 may be a contact type IC card. In this case, the IC chip may be mounted at a position shifted from the center position of the card 2 in the widthwise direction. Specifically, the IC chip is fixed at the position shifted in the same direction as the magnetic stripe from the center position of the card 2 in the widthwise direction.

The card 2 may be integrated with an antenna for communication in its inside and a printing part on which printing is performed by heat sensitive system may be formed on the surface of the card 2. Further, the card 2 may be a PET (polyethylene terephthalate) card whose thickness is about 0.18-0.36 mm, or may be a paper card.

The card insertion part 3 includes a shutter (not shown) for preventing insertion of a foreign matter, a detection mechanism (not shown) for detecting insertion of a card 2 and the like.

The first card operation part 4 includes a first magnetic head 10 as a first reproducing and recording part, which is abutted with the magnetic stripe of a card 2 to perform reproduction of magnetic information recorded in the magnetic stripe and recording of magnetic information to the magnetic stripe, a fading roller 11 which faces the first magnetic head 10, three pieces of first feeding rollers 12 for feeding the card 2 in the inside of the first card operation part 4, three pieces of pad rollers 13 which are faced and urged to the first feeding rollers 12, and a roller driving mechanism 14 for driving the first feeding rollers 12. A first feeding passage 15 through which the card 2 is passed is formed in the inside of the first card operation part 4.

The first card operation part 4 also includes a first card pressing mechanism 17 for pressing the card 2 toward a first card feeding reference face 16 (see FIG. 3) with which an end face in the short side direction of the card 2 carried through the first feeding passage 15 is abutted. In addition, when the card 2 is a contact type IC card having an IC chip, the first card operation part 4 includes a first IC contact block mechanism 18 for reproducing information recorded in the IC chip and recording information into the IC chip.

The first magnetic head 10 is disposed at a roughly center position in the feeding direction ("X" direction) of the card 2 of the first card operation part 4, and on a right end side of the first feeding passage 15 in the widthwise direction ("Y" direction) of the card 2. Further, the first magnetic head 10 is disposed on a lower side of the first feeding passage 15 so as to be capable of abutting with a lower face of the card 2 which is passed through the first feeding passage 15. The facing roller 11 faces the first magnetic head 10 from an upper side of the first magnetic head 10.

The roller driving mechanism 14 includes a drive motor 19 as a first drive source for rotationally driving three pieces of the first feeding rollers 12. Power of the drive motor 19 is transmitted to the first feeding rollers 12 through a plurality of pulleys 20 and a timing belt 21.

As shown in FIG. 3, the first card feeding reference face 16 is disposed on the right end side of the first card operation part 4 to form a right side end of the first feeding passage 15. Further, the first card feeding reference face 16 is formed over the substantially entire region of the first feeding passage 15 in the "X" direction. The first card feeding reference face 16 is a reference in the "Y" direction for the card 2 which is carried through the first feeding passage 15 and the right side end face of the carried card 2 is abutted with the first card feeding reference face 16.

The first card pressing mechanism 17 is disposed on a left end side of the first card operation part 4 to form a left side end of the first feeding passage 15. A detailed structure of the first card pressing mechanism 17 will be described below.

The first IC contact block mechanism 18 includes a first IC contact block 22 as the first reproducing and recording part, which is contacted with an IC chip in the card 2 to reproduce information recorded in the IC chip or to record information into the IC chip, and a solenoid 23 for moving the first IC contact block 22 in an up and down direction. The first IC contact block 22 stands by at an upper position with respect to the first feeding passage 15 when the card 2 is carried. When the card 2 is stopped at a predetermined information reproducing and recording position, the first IC contact block 22 is moved downward by power of the solenoid 23 to abut with the upper face of the card 2. The first IC contact block 22 is disposed on the front side of the first card operation part 4 in the "X" direction and on the right end side of the first feeding passage 15 in the "Y" direction.

The second card operation part 5 includes a second magnetic head 30 as a second reproducing and recording part, which is abutted with the magnetic stripe of the card 2 to perform reproduction of magnetic information recorded in the magnetic stripe and recording of magnetic information to the magnetic stripe, a facing roller 31 which faces the second magnetic head 30, three pieces of second feeding rollers 32 for feeding the card 2 in the inside of the second card operation part 5, three pieces of pad rollers 33 which are faced and urged to the second feeding rollers 32, and a roller driving mechanism 34 for driving the second feeding rollers 32. A second feeding passage 35 through which the card 2 is carried is formed in the inside of the second card operation part 5.

The second card operation part 5 also includes a second card pressing mechanism 37 for pressing the card 2 toward a second card feeding reference face 36 (see FIG. 3) with which an end face in the short side direction of the card 2 carried through the second feeding passage 35 is abutted. In addition, when the card 2 is a contact type IC card having an IC chip, the second card operation part 5 includes a second IC contact block mechanism 38 for reproducing information recorded in the IC chip and for recording information into the IC chip.

The second magnetic head 30 is disposed at a roughly center position in the "X" direction of the second card operation part 5 and on a left end side of the second feeding passage 35 in the "Y" direction. Further, the second magnetic head 30 is disposed on a lower side of the second feeding passage 35 so as to be capable of abutting with a lower face of the card 2 which is carried through the second feeding passage 35. The facing roller 31 faces the second magnetic head 30 from an upper side of the second magnetic head 30.

The roller driving mechanism 34 includes a drive motor 39 as a second drive source for rotationally driving three pieces of the second feeding rollers 32. Power of the drive motor 39 is transmitted to the second feeding rollers 32 through a plurality of pulleys 40 and a timing belt 41.

The second feeding roller 32 disposed on the most front side among three pieces of the second feeding rollers 32 is connected with a clutch mechanism 45 for connecting and disconnecting power transmission from the drive motor 39 to the second feeding roller 32. A detailed structure of the dutch mechanism 45 will be described below. The second feeding roller 32 which is disposed on the most front side is referred to as a "second feeding roller 32A".

As shown in FIG. 3, the second card feeding reference face 36 is disposed on the left end side of the second card operation part 5 to form a left side end of the second feeding passage 35. Further, the second card feeding reference face 36 is formed over the substantially entire region of the second feeding passage 35 in the "X" direction. The second card feeding reference face 36 is a reference face in the "Y" direction of the card 2 which is carried through the second feeding passage 35 and the left side end face of the carried card 2 is abutted with the second card feeding reference face 36.

The second card pressing mechanism 37 is disposed on a right end side of the second card operation part 5 to form a right side end of the second feeding passage 35. A detailed structure of the second card pressing mechanism 37 will be described below.

The second IC contact block mechanism 38 includes a second IC contact block 42 as a second reproducing and recording part, which is contacted with an IC chip in the card 2 to reproduce information recorded in the IC chip or to record information into the IC chip, and a solenoid 43 for moving the second IC contact block 42 in an up and down direction. The second IC contact block 42 stands by at an upper position with respect to the second feeding passage 35 when the card 2 is carried. When the card 2 is stopped at a predetermined information reproducing and recording position, the second IC contact block 42 is moved downward by power of the solenoid 43 to abut with the upper face of the card 2. The second IC contact block 42 is disposed on the back side of the second card operation part 5 in the "X" direction and on the left end side of the second feeding passage 35 in the "Y" direction.

In this embodiment, the first card operation part 4 and the second card operation part 5 are provided with the same structure as each other except that the second card operation part 5 is provided with the clutch mechanism 45. Specifically, the second card operation part 5 is arranged so that the first card operation part 4 is turned around 180° with the "Z" direction as an axial direction and the clutch mechanism 45 is added. Therefore, forming position of the first feeding passage 15 and forming position of the second feeding passage 35 in the "Z" direction are substantially coincided with each other.

Further, in this embodiment, when viewed from the "Z" direction, as shown in FIG. 3, the first card operation part 4 and the second card operation part 5 are disposed in a substantially point-symmetrical manner with respect to a predetermined virtual reference point "P" which is located on a virtual center line "CL1" passing a substantially center position between the first card feeding reference face 16 and the second card feeding reference face 36 in the "Y" direction. In other words, in this embodiment, the virtual reference point "P" is disposed between the first card operation part 4 and the second card operation part 5 in the "X" direction, and substantially the same structure as the first card operation part 4 is the second card operation part 5, and the first card operation part 4 and the second card operation part 5 are arranged in a substantially point-symmetrical manner with respect to the predetermined virtual reference point "P". Therefore, the second card operation part is regarded as that substantially the same structure as the first card operation part is disposed in a reversed state by 180 degree with respect to the first card operation part.

As a result, the first magnetic head 10 and the second magnetic head 30 are disposed in a substantially point-symmetrical manner with respect to the virtual reference point "P". Further, the first IC contact block 22 and the second IC contact block 42 are also disposed in a substantially point-symmetrical manner with respect to the virtual reference point "P".

Further, in this embodiment, the center "CL2" of the first feeding passage 15 and the center "CL3" of the second feeding passage 35 in the "Y" direction are different from each other in the "Y" direction (see FIG. 4) so that a distance "L" (see FIG. 4) in the "Y" direction between the first card feeding reference face 16 and the second card feeding reference face 36 is substantially equal to a width "W" (see FIG. 3) of the card 2. Specifically, the center "CL3" of the second feeding passage 35 is shifted on the right side with respect to the center "CL2" of the first feeding passage 15. In this embodiment, the center "CL" of the first feeding passage 15 is the center in the "Y" direction between two side plates 55 forming side faces of the first card operation part 4, and the center "CL3" of the second feeding passage 35 is the center in the "Y" direction between two side plates 55 forming side faces of the second card operation part 5.

The connecting part 6 is disposed between the first card operation part 4 and the second card operation part 5. As shown in FIG. 2, the connecting part 6 is formed with a connecting passage 44 through which the card 2 is capable of being passed. Both end sides in the "X" direction of the connecting passage 44 are widened toward outer sides in the "X" direction so that feeding of the card 2 between the connecting part 6 and the first card operation part 4 or the second card operation part 5 is smoothly performed.

Figure 6:
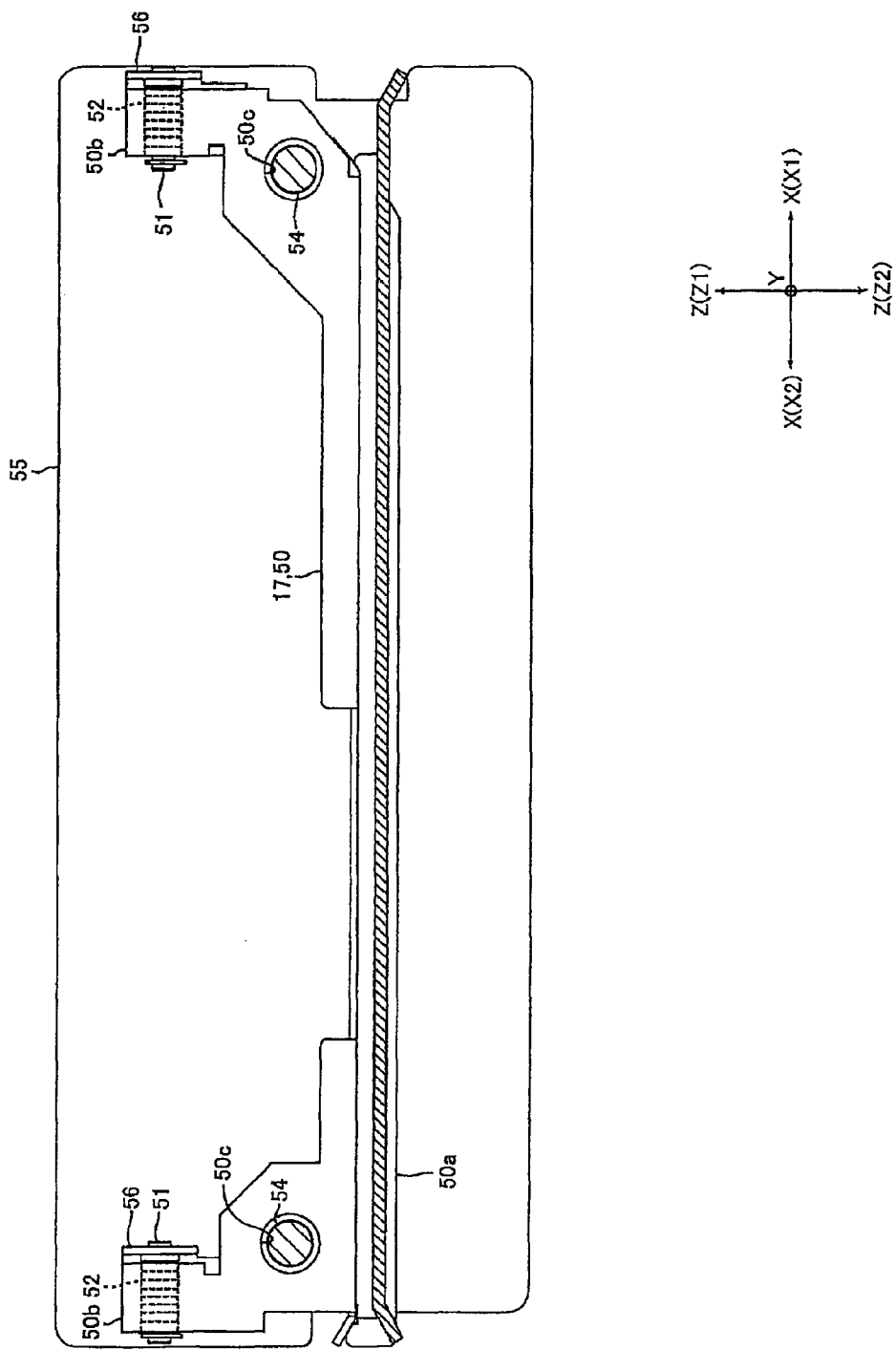
FIG. 6 is a side view showing the first pressing mechanism which is viewed from the "G-G" direction in FIG. 5.

FIG. 5 is a side view showing the first card pressing mechanism 17 which is viewed from the "F-F" direction in FIG. 1. FIG. 6 is a side view showing the first card pressing mechanism 17 which is viewed from the "G-G" direction in FIG. 5.

As shown in FIGS. 5 and 6, the first card pressing mechanism 17 includes a pressing member 50 for pressing the card 2 toward the first card feeding reference face 16, a fixed shaft 51 turnably holding the pressing member 50, and a torsion coil spring 52 which urges the pressing member 50.

The pressing member 50 includes a card abutting part 50a which abuts with a left end face of the card 2, and a holding part 50b which is held by the fixed shaft 51. The card abutting part 50a is formed on the lower end of the pressing member 50 and formed over the entire region in the "X" direction of the pressing member 50. The holding part 50b is formed on the upper end side of the pressing member 50 and formed on both ends in the "X" direction. Further, a lower side of the holding part 50b is formed with insertion holes 50c into which respective rotation shafts 54 of two feeding rollers 12 disposed on both end sides in the "X" direction are inserted. Both ends of the rotation shaft 54 are supported by bearings (not shown) attached to the side plates 55.

The fixed shaft 51 is fixed to a bracket 56 which is attached to the side plate 55 which forms the left side face of the first card operation part 4. The torsion coil spring 52 is held by the fixed shaft 51 in the state that the fixed shaft 51 is inserted.

In this embodiment, the pressing member 50 is urged by the torsion coil spring 52 in a counterclockwise direction in FIG. 5. Therefore, the card 2 is pressed by the first card pressing mechanism 17 against the first card feeding reference face 16 which forms the right end of the first feeding passage 15, and the right end face of the carried card 2 is abutted with the first card feeding reference face 16.

The second card pressing mechanism 37 is structured similarly to the first card pressing mechanism 17. In other words, the second card pressing mechanism 37 includes a pressing member 50, a fixed shaft 51 and a torsion coil spring 52. Therefore, a detailed structure of the second card pressing mechanism 37 is omitted. The pressing member 50 of the second card pressing mechanism 37 is urged in a turnable direction which is opposite to that of the pressing member 50 of the first pressing mechanism 17. As a result, the card 2 is pressed by the second card pressing mechanism 37 against the second card feeding reference face 36 which forms the left end of the second feeding passage 35, and the left end face of the carried card 2 is abutted with the second card feeding reference face 36.

Figure 7:
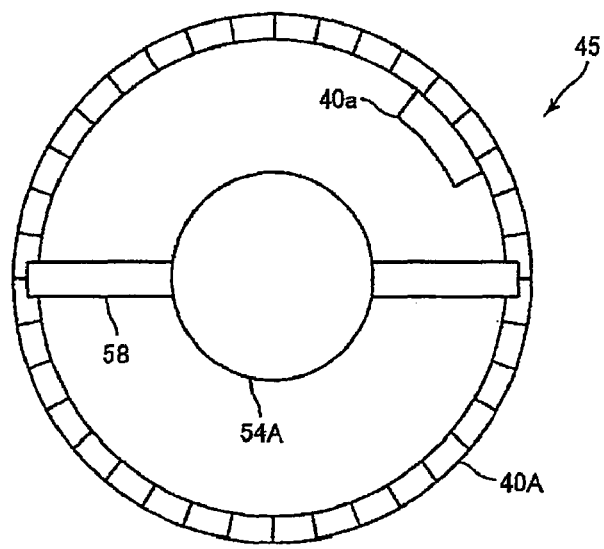
FIG. 7 is an explanatory side view showing a clutch mechanism shown in FIG. 1.

FIG. 7 is an explanatory side view showing the clutch mechanism 45 shown in FIG. 1.

As described above, the clutch mechanism 45 is connected with the second feeding roller 32A which is disposed on the most front side among three pieces of the second feeding rollers 32. As shown in FIGS. 1 and 7, the dutch mechanism 45 is structured of an engaging pin 58, which is fixed to a right side end of the rotation shaft 54 to which the second feeding roller 32A is fixed, and an engaging projection 40*a* which is formed on the pulley 40 attached to the right end of the rotation shaft 54. In this specification, the rotation shaft 54 to which the second feeding roller 32A is fixed is referred to as the "rotation shaft 54A" and the pulley 40 which is fixed to the rotation shaft 54A is referred to as the "pulley 40A".

The engaging pin 58 is press-fitted and fixed to a hole which is formed at the right end of the rotation shaft 54A on a further tip end side of the attached portion of the pulley 40A so that both ends are protruded on outer sides in a radial direction of the rotation shaft 54A. The engaging projection 40*a* is formed on an outer peripheral side of a right side face of the pulley 40A so as to protrude in the axial direction of the rotation shaft 54A. The engaging projection 40*a* is formed in a substantially circular arc shape to be capable of engaging with the engaging pin 58.

In this embodiment, the pulley 40A is rotatably held by the rotation shaft 54A. In other words, the pulley 40A is held by the rotation shaft 54A through a bearing (not shown). Therefore, even when the pulley 40A is rotated by means of that power of the drive motor 39 is transmitted to the pulley 40A through the timing belt 41 and the like, the rotation shaft 54A and the second feeding roller 32A are not rotated unless the engaging pin 58 and the engaging projection 40*a* are engaged with each other. In other words, the rotation shaft 54A and the second feeding roller 32A are rotated together with the pulley 40A only when the engaging pin 58 and the engaging projection 40*a* are engaged with each other.

As described above, the first card operation part 4 and the second card operation part 5 are adjacently disposed so that the distance between the first feeding roller 12 disposed on the most back side and the second feeding roller 32A is shorter than the length of the card 2. Therefore, when the card 2 is moved between the first card operation part 4 and the second card operation part 5, a situation may occur in which the card 2 is carried by two feeding rollers, i.e., the first feeding roller 12 disposed on the most back side and the second feeding roller 32A.

In this situation, when a difference may occur between a feeding speed of the card 2 by the first feeding roller 12 rotated by power of the drive motor 19 and a feeding speed of the card 2 by the second feeding roller 32A rotated by power of the drive motor 39, an appropriate feeding of the card 2 becomes difficult. However, in this embodiment, when a difference occurs between the feeding speed of the card 2 by the first feeding roller 12 and the feeding speed of the card 2 by the second feeding roller 32A, engagement of the engaging pin 58 with the engaging projection 40*a* is disengaged and power transmission from the drive motor 39 to the second feeding roller 32A is disconnected.

In other words, in a state that the card 2 is carried by two feeding rollers, i.e., the first feeding roller 12 disposed on the most back side and the second feeding roller 32A, when a difference occurs between the feeding speed of the card 2 by the first feeding roller 12 and the feeding speed of the card 2 by the second feeding roller 32A, power transmission from the drive motor 39 to the second feeding roller 32A is disconnected and the card 2 is carried at a speed corresponding to the feeding speed of the first feeding roller 12.

Figure 8:
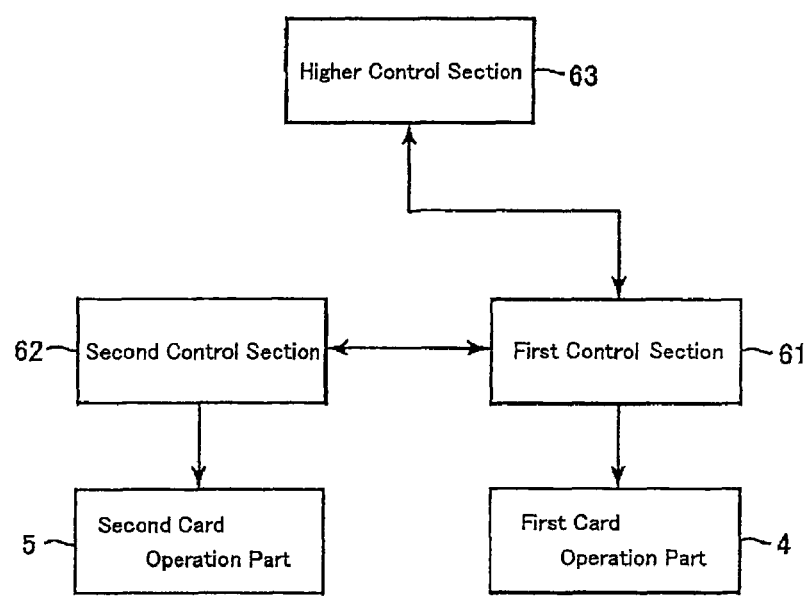
FIG. 8 is an explanatory block diagram showing structure of a control section of the card reader shown in FIG. 1.

FIG. 8 is an explanatory block diagram showing structure of a control section of the card reader 1 shown in FIG. 1.

As shown in FIG. 8, the control section of the card reader 1 is structured of a first control section 61 for controlling the first card operation part 4 and a second control section 62 for controlling the second card operation part 5. The first control section 61 is connected with a higher control section 63 which controls a host device (not shown), on which the card reader 1 is mounted, through a predetermined communication cable, and the second control section 62 is connected with the first control section 61 with a predetermined communication cable. Specifically, a communication port of the higher control section 63 is connected to a standard communication port of the first control section 61 and an expansion communication port of the first control section 61 is connected to a standard communication port of the second control section 62.

In this embodiment, the first control section 61 exchanges control signals with the higher control section 63. In other words, the first control section 61 controls the first card operation part 4 on the basis of a control command from the higher control section 63. On the other hand, the second control section 62 exchanges control signals with the first control section 61 and does not exchange control signals with the higher control section 63 directly. In other words, the first control section 61 sends a control signal to the second control section 62 as necessary and the second control section 62 controls the second card operation part 5 on the basis of the control command from the first control section 61. As described above, in this embodiment, the first control section 61 functions as a main control section and the second control section 62 functions as a sub-control section. Further, in this embodiment, the first control section 61 also controls the card insertion part 3 on the basis of a control command from the higher control section 63.

Figure 9:
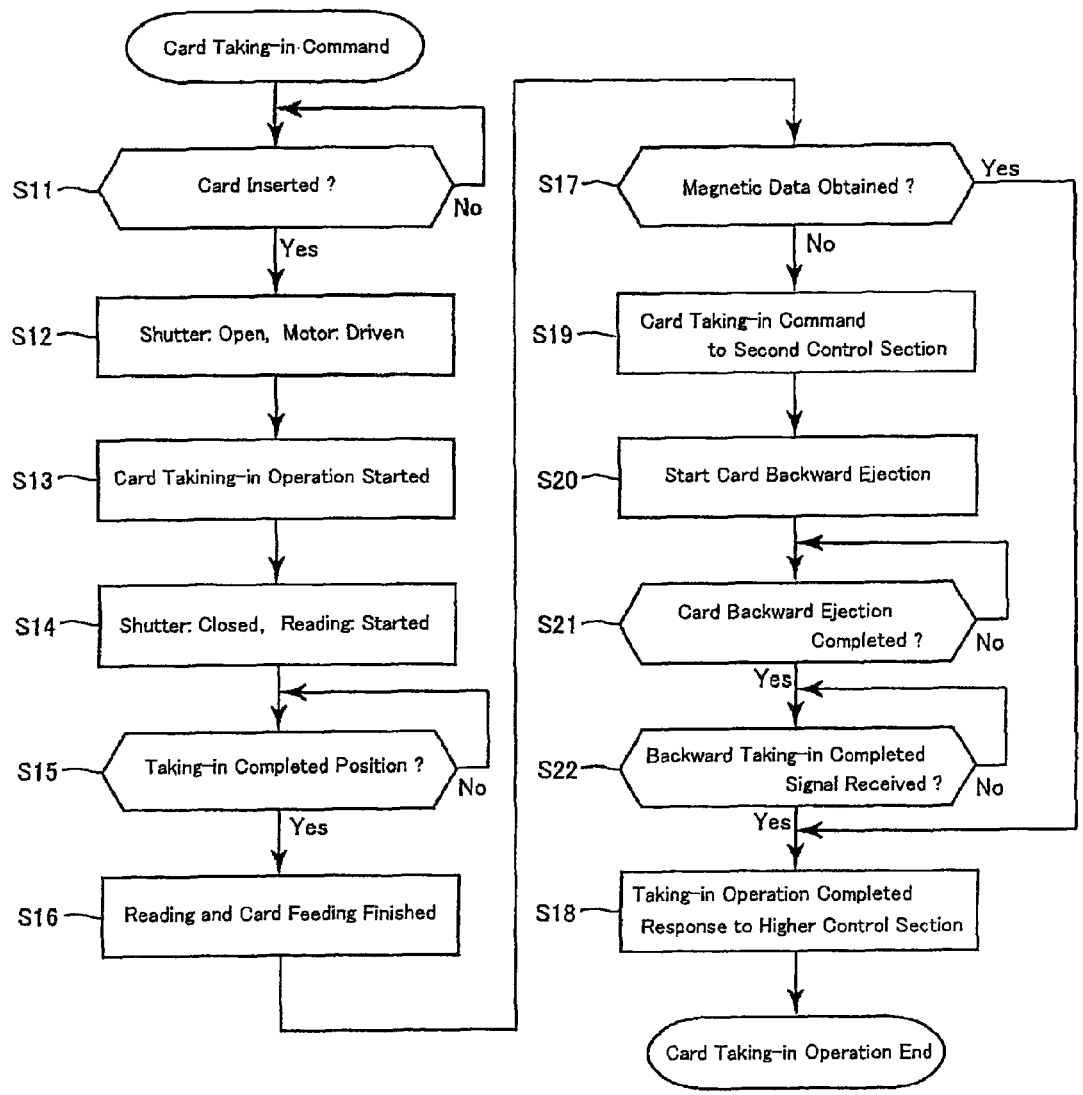
FIG. 9 is a flow chart showing a control flow at the time of card taking-in operation in the card reader shown in FIG. 1.
Figure 10:
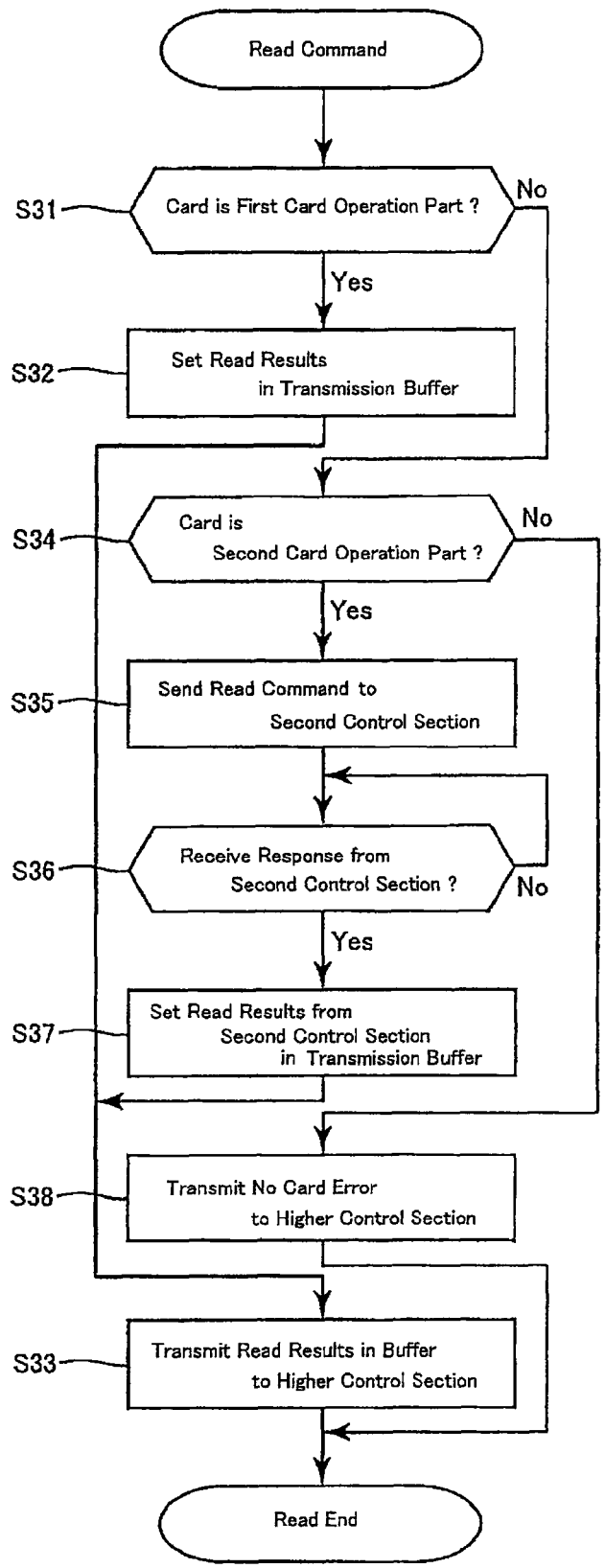
FIG. 10 is a flow chart showing a control flow at the time of magnetic information reproduction in the card reader shown in FIG. 1.
Figure 11:
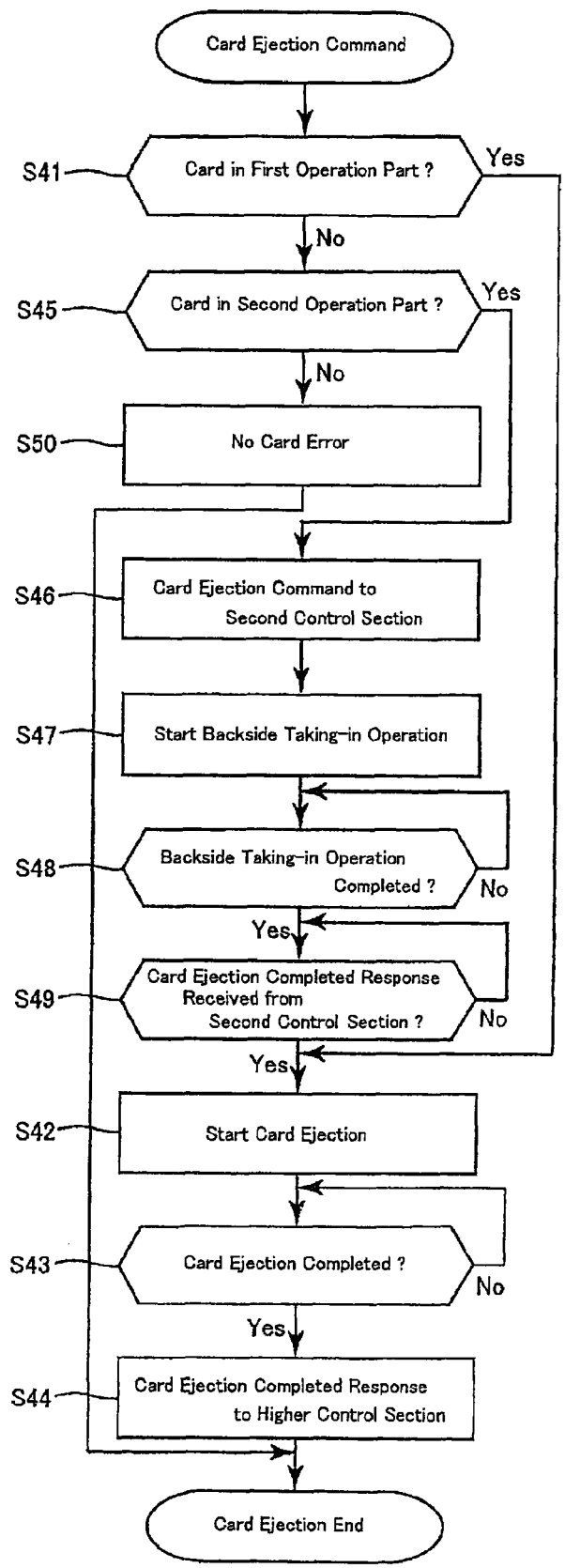
FIG. 11 is a flow chart showing a control flow at the time of card ejection in the card reader shown in FIG. 1.

FIG. 9 is a flow chart showing a control flow at the time of card taking-in operation in the card reader 1 shown in FIG. 1. FIG. 10 is a flow chart showing a control flow at the time of magnetic information reproduction in the card reader 1 shown in FIG. 1. FIG. 11 is a flow chart showing a control flow at the time of card ejection in the card reader 1 shown in FIG. 1.

A control method of a card taking-in operation, a control method at the time of magnetic information reproduction and a control method at the time of card ejection will be described below in this order as control methods for the card reader 1 which is structured as described above. FIGS. 9 through 11 show operation flows in the first control section 61.

First, a control method of a card taking-in operation will be described with reference to FIG. 9.

When the first control section 61 receives a taking-in command of a card 2 from the higher control section 63, the card reader 1 is set to be in an insertion waiting state for a card 2. In other words, the first control section 61 judges whether or not the detection mechanism provided in the card insertion part 3 has detected insertion of a card 2 (step S11). When insertion of the card 2 has been detected in the step S11, the first control section 61 opens a shutter in the card insertion part 3 and drives the drive motor 19 (step S12) to start a taking-in operation of the card 2 to the first card operation part 4 (step S13).

After that, the first control section 61 doses the shutter in the card insertion part 3 and starts reproduction (reading) of magnetic information on the card 2 by using the first magnetic head 10 (step S14). After that, the first control section 61 judges whether or not the card 2 has been carried to a predetermined taking-in completed position in the first card operation part 4 based on a rotation quantity of the drive motor 19 (step S15). When the card 2 has been carried to the predetermined taking-in completed position, the first control section 61 stops the drive motor 19 to finish feeding of the card 2 and reproduction of magnetic information on the card 2 by the first magnetic head 10 (step S16).

After that, the first control section 61 judges whether or not magnetic information on the card 2 has been reproduced by the first magnetic head 10 and magnetic data have been obtained (step S17). In a case that magnetic information on the card 2 has been reproduced by the first magnetic head 10 and magnetic data have been obtained, the card 2 has been inserted in a direction that the magnetic stripe of the card 2 and the first magnetic head 10 are contacted with each other. In other words, in this case, the operation of the card 2 can be performed in the first card operation part 4. Therefore, in this case, when the card 2 has been taken into the first card operation part 4, taking-in operation of the card 2 has been completed and the first control section 61 transmits a taking-in completed signal of the card 2 to the higher control section 63 (step S18).

On the other hand, in a case that magnetic information on the card 2 has not been reproduced by the first magnetic head 10 and magnetic data have not been obtained, the card 2 has been inserted in a direction that the magnetic stripe and the first magnetic head 10 do not contact with each other. In other words, in this case, operation of the card 2 is unable to perform in the first card operation part 4 and thus operation of the card 2 is required to perform in the second card operation part 5. Therefore, in this case, the first control section 61 transmits a taking-in command of the card 2 to the second control section 62 (step S19), which drives the drive motor 19 to start ejection (backward ejection) of the card 2 to the second card operation part 5 (step S20).

After that, the first control section 61 judges whether or not the backward ejection of the card 2 has been completed on the basis of rotation quantity of the drive motor 19 (step S21). When the backward ejection of the card 2 has been completed, the first control section 61 judges whether or not a taking-in completed signal of the card 2 in the second card operation part 5 has been received from the second control section 62 (step S22).

The second control section 62 which has received the taking-in command of the card 2 transmitted from the first control section 61 in the step S19 drives the drive motor 39 to start taking-in operation of the card 2 to the second card operation part 5. After that, the second control section 61 continues driving of the drive motor 39 and judges whether or not the card 2 has been carried to a predetermined taking-in completed position in the second card operation part 5 on the basis of rotation quantity of the drive motor 39. When the card 2 has been carried to the taking-in completed position, the second control section 61 stops the drive motor 39 to finish feeding of the card 2 and a taking-in completed signal of the card 2 is transmitted to the first control section 61.

When the first control section 61 receives the taking-in completed signal of the card 2 from the second control section 62 in the step S22, the first control section 61 has completed taking-in operation of the card 2 to transmit a taking-in completed signal of the card 2 to the higher control section 63 (step S18).

Next, a control method at the time of magnetic information reproduction will be described below with reference to FIG. 10.

When the first control section 61 receives a reproduction command of magnetic information from the higher control section 63, the first control section 61 judges whether or not there is a card 2 in the first card operation part 4 (step S31). In a case that there is a card 2 in the first card operation part 4, the first control section 61 sets magnetic information reproduced at the time of taking-in operation of the card 2 to the first card operation part 4 in a transmission buffer in the first control section 61 (step S32) and the set magnetic information is transmitted to the higher control section 63 (step S33).

On the other hand, when there is no card 2 in the first card operation part 4, the first control section 61 judges whether or not there is a card 2 in the second card operation part 5 (step S34). Specifically, the first control section 61 exchanges control signals with the second control section 62 and the first control section 61 judges whether or not there is a card 2 in the second card operation part 5.

In a case that there is a card 2 in the second card operation part 5, the first control section 61 transmits a reproduction command of magnetic information to the second control section 62 (step S35) and, after that, the first control section 61 judges whether or not reproduced magnetic information has been received from the second control section 62 (step S36).

When the second control section 62 receives the reproduction command of magnetic information from the first control section 61, the second control section 62 drives the drive motor 39 to reproduce magnetic information by using the second magnetic head 30 and magnetic data are obtained. Further, the second control section 62 transmits the reproduced magnetic information to the first control section 61.

When the first control section 61 receives the magnetic information reproduced by the second magnetic head 30 from the second control section 62 in the step S36, the first control section 61 sets the received magnetic information in the transmission buffer in the first control section 61 (step S37), and the set magnetic information is transmitted to the higher control section 63 (step S33).

When there is also no card 2 in the second card operation part 5 in the step S34, the first control section 61 transmits an error signal that there is no card 2 in the card reader 1 to the higher control section 63 (step S38).

Finally, a control method at the time of card ejection will be described below with reference to FIG. 11.

When the first control section 61 receives an ejection command of a card 2 from the higher control section 63, the first control section 61 judges whether or not there is a card 2 in the first card operation part 4 (step S41). When there is a card 2 in the first card operation part 4, the first control section 61 drives the drive motor 19 to start ejection of the card 2 from the inside of the first card operation part 4 to the front side (step S42). After that, the first control section 61 judges whether or not the ejection of the card 2 has been completed on the basis of rotation quantity of the drive motor 19 and the like (step S43) and, when the ejection of the card 2 has been completed, the first control section 61 transmits an ejection completion signal of the card 2 to the higher control section 63 (step S44).

On the other hand, when there is no card 2 in the first card operation part 4, the first control section 61 judges whether or not there is a card 2 in the second card operation part 5 (step S45). Specifically, the first control section 61 exchanges control signals with the second control section 62 and the first control section 61 judges whether or not there is a card 2 in the second card operation part 5.

In a case that there is a card 2 in the second card operation part 5, the first control section 61 transmits an ejection command of the card 2 to the second control section 62 (step S46). Further, the first control section 61 drives the drive motor 19 to start a taking-in operation of the card 2 (backside taking-in operation) (step S47). After that, the first control section 61 judges whether or not the backside taking-in operation of the card 2 has been completed on the basis of rotation quantity of the drive motor 19 and the like (step S48) and, when the backside taking-in operation of the card 2 has been completed, the first control section 61 judges whether or not an ejection completion signal of the card 2 from the second card operation part 5 has been received from the second control section 62 (step S49).

The second control section 62 which receives the ejection command of a card 2 drives the drive motor 39 to start ejection of the card 2 to the first card operation part 4. After that, the second control section 61 continues driving of the drive motor 39 and judges whether or not the card 2 has been ejected from the second card operation part 5 on the basis of rotation quantity of the drive motor 39 and the like. When the ejection of the card 2 has been completed, the second control section 61 stops the drive motor 39 and transmits an ejection completion signal of the card 2 to the first control section 61.

In the step S49, when the first control section 61 receives the ejection completion signal of the card 2 from the second control section 62, the first control section 61 starts to eject the card 2 from the inside of the first card operation part 4 to the front side (step S42).

In the step S45, when there is also no card 2 in the second card operation part 5, the first control section 61 transmits an error signal that there is no card 2 in the card reader 1 to the higher control section 63 (step S50).

In the embodiment described above, the control method at the time of reproduction of magnetic information has been described as one of control methods for the card reader 1. A control flow at the time of recording of magnetic information on the card 2 is roughly similar to the control flow shown in FIG. 10. In other words, in a case that the first control section 61 receives a recording command of magnetic information from the higher control section 63, when there is a card 2 in the first card operation part 4, the first control section 61 drives the drive motor 19 and recording (writing) of magnetic information is performed by the first magnetic head 10. Alternatively, when there is a card 2 in the second card operation part 5, the first control section 61 sends a recording command of magnetic information to the second control section 62. Further, the second control section 62 drives the drive motor 39 and magnetic information is recorded by the second magnetic head 30.

A control flow at the time of taking-in operation of a contact type IC card having a magnetic stripe and a control flow at the time of ejection are similar to the control flows shown in FIGS. 9 and 11, and a control flow at the time of ejection of a contact type IC card which is provided with no magnetic stripe is also similar to the control flow shown in FIG. 11. Further, in a control flow at the time of taking-in operation of a contact type IC card which has no magnetic stripe, after starting a taking-in operation of a card 2, the first control section 61 judges whether or not information has been reproduced through the first IC contact block 22 and, if necessary, the first control section 61 transmits a taking-in command of a card 2 to the second control section 62. This control flow is roughly the same as the control flow shown in FIG. 9.

A control flow at the time of reproduction of information recorded in an IC chip of a contact type IC card and a control flow at the time of recording information into the IC chip are roughly the same as the control flow shown in FIG. 10. In other words, except that information recorded in the IC chip is reproduced or information is recorded into the IC chip instead of reproducing or recording of magnetic information, a control flow at the time of reproduction of information recorded in the IC chip of a contact type IC card and a control flow at the time of recording information into the IC chip are roughly the same as the control flow shown in FIG. 10.

As described above, in this embodiment, the first card operation part 4 having the first magnetic head 10 and the second card operation part 5 having the second magnetic head 30 are adjacenty disposed in the feeding direction of a card 2. Further, when viewed from the "Z" direction, the first magnetic head 10 and the second magnetic head 30 are disposed in a substantially point-symmetrical manner with respect to the virtual reference point "P" which is located on the virtual center line "CL1". Therefore, in this embodiment, even when a card 2 is inserted into the card reader 1 from either end in its longitudinal direction, magnetic information recorded in a magnetic stripe is reproduced and magnetic information is recorded in the magnetic stripe.

Further, in this embodiment, the first card operation part 4 having the first IC contact block 22 and the second card operation part 5 having the second IC contact block 42 are adjacently disposed in the feeding direction of the card 2 and, when viewed from the "Z" direction, the first IC contact block 22 and the second IC contact block 42 are disposed in a substantially point-symmetrical manner with respect to the virtual reference point "P" which is located on the virtual center line "CL1". Therefore, in this embodiment, in a case that an operation of a contact type IC card is to be performed, even when a card 2 is inserted into the card reader 1 from either end in its longitudinal direction, information recorded in the IC chip is reproduced and information is recorded in the IC chip.

In this embodiment, the first card pressing mechanism 17 presses a card 2 toward the first card feeding reference face 16 which forms the right end of the first feeding passage 15, and the second card pressing mechanism 37 presses the card 2 toward the second card feeding reference face 36 which forms the left end of the second feeding passage 35. Therefore, even when the first magnetic head 10 and the second magnetic head 30 are disposed in a substantially point-symmetrical manner with respect to the virtual reference point "P" which is located on the virtual center line "CL1", in the first card operation part 4, the magnetic stripe of the card 2 is aligned with the first magnetic head 10 by the first card pressing mechanism 17 and, in the second card operation part 5, the magnetic stripe is aligned with the second magnetic head 30 by the second card pressing mechanism 37. Accordingly, reproducing operation of magnetic information recorded on the card 2, whose positional accuracy of the magnetic stripe is required, and recording operation of magnetic information on the card 2 are performed adequately.

Further, even when the first IC contact block 22 and the second IC contact block 42 are disposed in a substantially point-symmetrical manner with respect to the virtual reference point "P" which is located on the virtual center line "CL1", in the first card operation part 4, the IC chip of the card 2 is aligned with the first IC contact block 22 by the first card pressing mechanism 17 and, in the second card operation part 5, the IC chip of the card 2 is aligned with the second IC contact block 42 by the second card pressing mechanism 37. Accordingly, reproducing operation of information recorded in the card 2, whose positional accuracy of the IC chip is required, and recording operation of information in the card 2 are performed adequately. As described above, the card reader 1 in this embodiment can be used even in an application in which a high degree of recording positional accuracy of information to the card 2 is required.

In this embodiment, the center "CL2" of the first feeding passage 15 and the center "CL3" of the second feeding passage 35 in the "Y" direction are shifted from each other in the "Y" direction so that the distance "L" in the "Y" direction between the first card feeding reference face 16 and the second card feeding reference face 36 is substantially equal to the width "W" of the card 2. Therefore, even when the first card feeding reference face 16 is formed at the right end of the first feeding passage 15 and the second card feeding reference face 36 is formed at the left end of the second feeding passage 35, a card 2 is carried along both the reference faces of the first card feeding reference face 16 and the second card feeding reference face 36 when the card 2 is carried between the first card operation part 4 and the second card operation part 5. Accordingly, even when the card 2 is moved between the first card operation part 4 and the second card operation part 5, aligning of the first magnetic head 10 or the second magnetic head 30 with the magnetic stripe, and aligning of the first IC contact block 22 or the second IC contact block 42 with the IC chip can be performed smoothly.

In this embodiment, the second feeding roller 32A disposed on the most front side among three pieces of the second feeding rollers 32 is connected with the dutch mechanism 45 for connecting and disconnecting power transmission from the drive motor 39 to the second feeding roller 32A. Therefore, even when a difference occurs between the feeding speed of the card 2 by the first feeding roller 12 and the feeding speed of the card 2 by the second feeding roller 32A, the card 2 is smoothly carried between the first card operation part 4 and the second card operation part 5.

In this embodiment, the first control section 61 exchanges control signals with the higher control section 63 and controls the first card operation part 4 on the basis of a control command from the higher control section 63. On the other hand, the second control section 62 exchanges control signals with the first control section 61 and does not exchange with the higher control section 63 directly. In other words, the first control section 61 sends a control signal to the second control section 62 as necessary and the second control section 62 controls the second card operation part 5 on the basis of the control command from the first control section 61.

Therefore, even though the higher control section 63 exchanges control signals only with the first control section 61, the higher control section 63 is capable of controlling both of the first card operation part 4 and the second card operation part 5. For example, as described above, the higher control section 63 is capable of controlling the first card operation part 4 and the second card operation part 5 only by means of that a taking-in command or an ejection command of a card 2, or a reproduction command of magnetic information is transmitted to the first control section 61. Therefore, in this embodiment, operations of the higher control section 63 is simplified and control programs of the higher control section 63 is simplified. Further, in the higher control section 63, a port to be connected with the second control section 62 is not required and thus a structure of the higher control section 63 is simplified.

In this embodiment, the second card operation part 5 is provided with the substantially same structure as the first card operation part 4, and the first card operation part 4 and the second card operation part 5 are arranged in a substantially point-symmetrical manner with respect to the virtual reference point "P". Therefore, the structure of the first card operation part 4 and the structure of the second card operation part 5 are substantially the same as each other and thus the first card operation part 61 and the second card operation part 62 can be controlled by the same control method. Accordingly, in this embodiment, control programs for the card reader 1 can be simplified.

Although the present invention has been shown and described with reference to a specific embodiment, various changes and modifications will be apparent to those skilled in the art from the teachings herein. For example, a detection mechanism for detecting the magnetic stripe may be disposed on both end sides in the "Y" direction of the card insertion part 3. According to this structure, it is detected by the detection mechanism from which end side in the longitudinal direction of a card 2 having a magnetic stripe is inserted. Therefore, it is judged by using the detection mechanism whether reproducing and recording operations of a card 2 are performed in the first card operation part 4 or in the second card operation part 5. In other words, immediately after a card 2 is inserted, it is judged whether reproducing and recording operations of a card 2 are performed in the first card operation part 4 or in the second card operation part 5. Therefore, reproducing operation and recording operation of an inserted card 2 can be performed smoothly.

In the embodiment described above, the distance "L" in the "Y" direction between the first card feeding reference face 16 and the second card feeding reference face 36 is substantially equal to the width "W" of the card 2. However, the present invention is not limited to this embodiment. For example, the first card operation part 4 and the second card operation part 5 may be disposed so that the distance "L" between the first card feeding reference face 16 and the second card feeding reference face 36 is set to be wider than the width "W" of the card 2.

In the embodiment described above, the first card operation part 4 and the second card operation part 5 are provided with substantially the same structure as each other. However, the first card operation part 4 and the second card operation part 5 may be provide with completely different structures.

In the embodiment described above, the first magnetic head 10 and the second magnetic head 30 are disposed in a substantially point-symmetrical manner with respect to the virtual reference point "P" which is disposed between the first card operation part 4 and the second card operation part 5 in the "X" direction. However, the present invention is not limited to this embodiment. For example, the first magnetic head 10 and the second magnetic head 30 may be disposed in a substantially point-symmetrical manner with respect to the virtual reference point "P" which is disposed in the inside of the first card operation part 4 or the inside of the second card operation part 5. Similarly, in the embodiment described above, the first IC contact block 22 and the second IC contact block 42 are disposed in a substantially point-symmetrical manner with respect to the virtual reference point "P" which is disposed between the first card operation part 4 and the second card operation part 5. However, the first IC contact block 22 and the second IC contact block 42 are disposed in a substantially point-symmetrical manner with respect to the virtual reference point "P" which is disposed in the inside of the first card operation part 4 or the inside of the second card operation part 5.

In the embodiment described above, the clutch mechanism 45 is connected with the second feeding roller 32A which is disposed on the most front side. However, the present invention is not limited to this embodiment. For example, it may be structured that the dutch mechanism 45 is not attached to the second feeding roller 32A and a dutch mechanism similar to the clutch mechanism 45 is connected with the first feeding roller 12 which is disposed on the most back side.

In the embodiment described above, the first card operation part 4 includes the first IC contact block 22 and the second card operation part 5 includes the second IC contact block 42. However, a contact type IC card is not used in the card reader 1, the card reader 1 may not include the first IC contact block 22 and the second IC contact block 42. Further, in the embodiment described above, the first card operation part 4 includes the first magnetic head 10 and the second card operation part 5 includes the second magnetic head 30. However, a magnetic card is not used in the card reader 1, the card reader 1 may not include the first magnetic head 10 and the second magnetic head 30.

In the embodiment described above, the pressing member 50 is urged by the torsion coil spring 52 so as to press a card 2 against the first card feeding reference face 16 or the second card feeding reference face 36. However, the present invention is not limited to this embodiment. For example, the pressing member 50 may be urged by another spring such as a compression coil spring or a flat spring, or an elastic member such as rubber.

Other examples related to the embodiments described above will be described as follows.

FIRST EXAMPLE

A card reader comprising:

a first card operation part including a first reproducing and recording part which performs reproduction of information recorded in a card and/or recording of information to the card;

a first control section for controlling the first card operation part;

a second card operation part which includes a second reproducing and recording part for performing reproduction of information recorded in a card and/or recording of information to the card, and which is adjacently disposed to the first card operation part in a feeding direction of the card; and a second control section for controlling the second card operation part;

wherein the first control section is connected to a higher control section which controls a host device on which the card reader is mounted, and the second control section is connected to the first control section, and the first control section exchanges control signals with the higher control section and the second control section exchanges control signals with the first control section.

SECOND EXAMPLE

The card reader according to the first example, wherein the first control section controls the first card operation part on the basis of a control command from the higher control section, and the second control section controls the second card operation part on the basis of a control command from the first control section.

THIRD EXAMPLE

The card reader according to the first or the second example, wherein the first card operation part and the second card operation part are provided with structure almost similar to each other.

FOURTH EXAMPLE

A control method for a card reader which includes a first card operation part including a first reproducing and recording part which performs reproduction of information recorded in a card and/or recording of information to the card, and a second card operation part which includes a second reproducing and recording part for performing reproduction of information recorded in a card and/or recording of information to the card, and which is adjacently disposed to the first card operation part in a feeding direction of the card, comprising:

controlling the first card operation part with a control signal from a higher control section which controls a host device on which the card reader is mounted; and controlling the second card operation part with a control signal from a first control section which controls the first card operation part.

In a conventional card reader for ATM (Automated Teller Machine) or the like, an inserted direction of a card is determined and, when a card is not inserted in a normal direction, a reading operation or a writing operation of information on a card is not performed. Therefore, in the conventional card reader, for example, a detection mechanism for detecting a magnetic stripe provided on a card is disposed at a card insertion port of the card reader and, only when the magnetic stripe on the card has been detected by the detection mechanism, the card is taken into the inside of the card reader and reading and writing operations of information are performed on the card. In other words, appropriateness of the inserted direction of a card is judged by detecting the magnetic stripe.

In recent years, an IC card without a magnetic stripe has become popular in a market and a card reader is required to perform reading and writing operations of information to a card without a magnetic stripe. As a result, a card whose appropriateness of an inserted direction is not judged by detecting the magnetic stripe is required to be taken into the inside of a card reader and thus some card readers accept a card without judging appropriateness of inserted direction of the card. Since a card taken into the inside in a wrong direction is not operated, when a card is inserted in a wrong direction, the card reader returns the card. Therefore, a user is required to insert the card in a normal direction again and thus serviceability for a user is not satisfactory.

In the first through fourth examples described above, the card reader includes the first card operation part having a first reproducing and recording part and the second card operation part which is provided with a second reproducing and recording part and is adjacently disposed to the first card operation part. Therefore, for example, a card inserted in a normal direction is operated by the first card operation part and a card inserted in a wrong direction is operated by the second card operation part. Accordingly, a user is not required to insert the card again and thus serviceability for the user is improved.

On the other hand, the host device on which the card reader is mounted is required to control the first card operation part and the second card operation part, which may cause control of the host device to be complicated. However, in the first through third examples described above, the first control section which controls the first card operation part exchanges control signals with the higher control section which controls the host device on which the card reader is mounted, and the second control section which controls the second card operation part exchanges control signals with the first control section. In other words, the first control section controls the first card operation part on the basis of a control command from the higher control section, and the second control section controls the second card operation part on the basis of a control command from the first control section. Further, in the above-mentioned fourth example, the first card operation part is controlled with a control signal from the higher control section and the second card operation part is controlled with a control signal from the first control section.

Therefore, although the higher control section exchanges control signals only with the first control section, the higher control section is capable of controlling both of the first card operation part and the second card operation part. For example, the higher control section controls the first card operation part and the second card operation part by means of that the higher control section exchanges control signals for controlling the first card operation part with the first control section. Therefore, operations in the higher control section are simplified and control programs for the higher control section are simplified. Further, the higher control section is capable of indirectly controlling the second card operation part even though the second control section is not connected to the higher control section directly. Therefore, in the higher control section, a port for connecting with the second control section is not required and a structure of the higher control section can be simplified. In addition, when the first card operation part is structured in the same manner as a conventional card reader, the specification of the host device can be modified without changing the structure of the higher control section and operation programs.

In a case that the first through fourth examples are to be applied, substantially the same structure as the first card operation part 4 may be adjacently disposed to the first card operation part 4 as the second card operation part 5 in a reversed state (in a state turned by 180° with the "Y" direction as an axial direction).

Further, as modified examples of the first through fourth examples, the card reader 1 may include three or more card operation parts. In other words, modified examples of the first through fourth examples are, for example, as follows.

FIFTH EXAMPLE

A card reader comprising:
a plurality of card operation parts including a reproducing and recording part which performs reproduction of information recorded in a card and/or recording of information to the card; and
a plurality of control sections for respectively controlling the card operation parts;
wherein a main control section which is one of the plurality of the control sections is connected to a higher control section which controls a host device on which the card reader is mounted, and remaining control section(s) other than the main control section is parallelly or serially connected to the main control section, and
wherein the main control section exchanges control signals with the higher control section, and the remaining control section(s) other than the main control section directly or indirectly exchanges control signals with the main control section.

SIXTH EXAMPLE

A control method for a card reader which includes a plurality of card operation parts including a reproducing and recording part which performs reproduction of information recorded in a card and/or recording of information to the card, and a plurality of control sections for respectively controlling the card operation parts, comprising:
controlling a main card operation part which is one of the plurality of the card operation parts with a control signal from a higher control section which controls a host device on which the card reader is mounted; and
controlling remaining card operation parts with a control signal directly or indirectly sent from a main control section for controlling the main card operation part.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card member-reader comprising:
    a first card operation part comprising:
        a first reproducing and recording part structured to perform at least one of reproduction of information recorded in the card and recording of information to the card;
        a plurality of first feeding rollers for feeding the card;
        a first drive source for driving the first feeding rollers;
        a first feeding passage through which the card is carried; and
        a first card pressing mechanism structured to press the card toward a first card feeding reference face of the first feeding passage which is formed on one side in a widthwise direction of the card which is perpendicular to a feeding direction of the card;
    a second card operation part structured to be separated from the first card operation part, comprising:
        a second reproducing and recording part structured to perform at least one of reproduction of information recorded in the card and recording of information to the card;
        a plurality of second feeding rollers for feeding the card;
        a second drive source which is separately provided from the first drive source for driving the second feeding rollers;
        a second feeding passage through which the card is carried, the second feeding passage is provided so as to be separated from the first feeding passage; and a second card pressing mechanism structured to press the card toward a second card feeding reference face of the second feeding passage, the second card feeding reference face being formed on an opposite side to the first card feeding reference face in the widthwise direction of the card; and a connecting part which is disposed between the first card operation part and the second card operation part so as to form a connecting passage between the first feeding passage and the second feeding passage;

wherein the first card operation part and the second card operation part are adjacently disposed through the connecting part in a feeding direction of the card so that the card is carried between the first card operation part and the second card operation part through the connecting part;

wherein the first reproducing and recording part and the second reproducing and recording part are disposed in a substantially point-symmetrical manner with respect to a virtual reference point on a virtual center line which passes through a substantially center position in the widthwise direction of the card between the first card feeding reference face and the second card feeding reference face when viewed from a thickness direction of the card; and wherein one of the first feeding roller which is disposed on a second card operation part side and the second feeding roller which is disposed on a first card operation part side is connected with a clutch mechanism for connecting or disconnecting power transmission from the first drive source or the second drive source so that the card is smoothly moved between the first feeding roller which is disposed on the second card operation part side and the second feeding roller which is disposed on the first card operation part side through the connecting part even when a feeding speed of the card by the first feeding roller and a feeding speed of the card by the second feeding roller are different from each other.

2. The card reader according to claim 1, wherein a center of the first feeding passage and a center of the second feeding passage in the widthwise direction of the card are different from each other in the widthwise direction of the card so that a distance in the widthwise direction of the card between the first card feeding reference face and the second card feeding reference face is substantially equal to a width of the card.

3. The card reader according to claim 1, wherein
the virtual reference point is disposed between the first card operation part and the second card operation part in the feeding direction of the card,
the second card operation part is provided with substantially same structure as the first card operation part, and
the first card operation part and the second card operation part are disposed in a substantially point-symmetrical manner with respect to the virtual reference point.

4. The card reader according to claim 3, wherein
the card is a magnetic card provided with a magnetic stripe, and
the first reproducing and recording part and the second reproducing and recording part are a magnetic head.

5. The card reader according to claim 4, further comprising a detection mechanism structured to detect the magnetic stripe which is disposed on an end side in the widthwise direction of the card at a card insertion part into which the card is inserted.

6. The card reader according to claim 1, further comprising a first control section structured to control the first card operation part, and a second control section structured to control the second card operation part;
wherein the first control section is connected to a higher control section which is structured to control a host device on which the card reader is mounted, and the second control section is connected to the first control section, and
wherein the first control section is structured to exchange control signals with the higher control section and the second control section is structured to exchange control signals with the first control section.

7. The card reader according to claim 6, wherein
the first control section is structured to control the first card operation part on basis of a control command from the higher control section, and
the second control section is structured to control the second card operation part on basis of a control command from the first control section.

8. A card reader for use with a card, the card member comprising:
a first card operation part comprising:
a first reproducing and recording part structured to perform at least one of reproduction of information recorded in the card and recording of information to the card;
a first feeding passage through which the card is carried; and
a first card pressing mechanism structured to press the card toward a first card feeding reference face of the first feeding passage which is formed on one side in a widthwise direction of the card which is perpendicular to a feeding direction of the card;
a second card operation part comprising:
a second reproducing and recording part structured to perform at least one of reproduction of information recorded in the card and recording of information to the card;
a second feeding passage through which the card is carried; and
a second card pressing mechanism structured to press the card toward a second card feeding reference face of the second feeding passage which is formed on other side in the widthwise direction of the card;
a first control section structured to control the first card operation part; and
a second control section structured to control the second card operation part;
wherein the first card operation part and the second card operation part are adjacently disposed in a feeding direction of the card so that the card is carried between the first card operation part and the second card operation part;
wherein the first reproducing and recording part and the second reproducing and recording part are disposed in a substantially point-symmetrical manner with respect to a virtual reference point on a virtual center line which passes a substantially center position in the widthwise direction of the card between the first card feeding reference face and the second card feeding reference face when viewed from a thickness direction of the card;
wherein the first control section is connected to a higher control section which is structured to control a host device on which the card reader is mounted, and the second control section is connected to the first control section, and
wherein the first control section is structured to exchange control signals with the higher control section and the second control section is structured to exchange control signals with the first control section.

9. The card reader according to claim 8, wherein the first control section is structured to control the first card operation part on basis of a control command from the higher control section, and the second control section is structured to control the second card operation part on basis of a control command from the first control section.

* * * * *